United States Patent Office 3,232,941
Patented Feb. 1, 1966

3,232,941
N,N'-DIALKYLTRIETHYLENEDIAMMONIUM DINITRATES
Thomas E. Deger, Ambler, Pa., and Herbert Q. Smith, Trenton, N.J., assignors to Pennsalt Chemicals Corporation, Philadelphia, Pa., a corporation of Pennsylvania
No Drawing. Original application Mar. 13, 1959, Ser. No. 799,115, now Patent No. 3,063,880, dated Nov. 13, 1962. Divided and this application Mar. 26, 1962, Ser. No. 182,680
6 Claims. (Cl. 260—268)

This is a division of application Serial No. 799,115, filed March 13, 1959, now Patent Number 3,063,880.

This invention is directed to monopropellants which are new compositions of matter and which find use as the principal ingredient along with oxidizers as rocket fuels. The invention is also directed to new rocket fuel compositions combining the monopropellant with strong oxidizers.

More specifically, this invention is directed to N,N'-dialkyltriethylenediammonium dinitrates as new compositions of matter and to rocket fuel mixtures embodying N,N'-dialkyltriethylenediammonium dinitrates in admixture with strong oxidizers. The N,N'-dialkyltriethylenediammonium dinitrates may also be designated N,N'-dialkyl-1,4-diazabicyclo[2.2.2]octane dinitrate and may be represented by the following formula

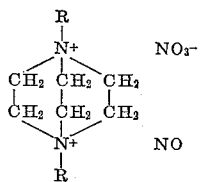

where R is alkyl of from $C_1$ through $C_5$ carbon atoms.

The N,N'-dialkyltriethylenediammonium dinitrates embodied in our invention comprise the N,N₂-dialkyltriethylenediammonium dinitrates in which the alkyl substituents may vary from $C_1$ to $C_5$ carbon atoms. Thus, the alkyl substituents useful in our new compositions are methyl, ethyl, propyl, isopropyl, secondary butyl, tertiary butyl, butyl, isobutyl, amyl, isoamyl, secondary amyl and neopentyl. The alkyl substituents may be identical or they may be mixed. For example, they may be dimethyl or methyl-ethyl substituents. The methyl, ethyl, isopropyl, tertiary butyl and neopentyl substituents are preferred for the fuel systems because of the condensed nature of the molecules. These are less subject to attack by the nitric acid or other oxidizers prior to combustion.

The new chemical compositions may be combined with strong oxidizers to obtain monopropellant high energy fuels useful for rocketry. Among the oxidizers which will combine with the new compositions to form new fuel compositions are red fuming nitric acid, white fuming nitric acid, 100% nitric acid, 100% nitrogen tetroxide, 100% nitrogen tetroxide containing a small amount of nitric oxide (NO) and 100% nitrogen tetroxide containing a small amount of nitryl fluoride ($NO_2F$) and 100% nitrogen tetroxide ($N_2O_4$) plus traces of water not exceeding 2%. Commercial nitric acid containing as high as 30% water has been used in special applications where additional water is desired to cool the combustion flame to prolong the life of the rocket engine. It will of course be appreciated that small amounts of moisture may be present in all of the above compositions without departing from their utility as oxidizers with the new dialkyltriethylenediammonium dinitrates.

As an indication of the high order of power produced by the combustion of the new N,N'-dialkyltriethylenediammonium dinitrates with strong oxidizing agents, the N,N'-dimethyltriethylenediammonium dinitrate in combustion with 100% nitric acid has a specific impulse of 238 pound seconds per pound at 600 pounds per square inch absolute chamber pressure venting to 14.7 pounds per square inch absolute under the conditions of continuous equilibrium in the exhaust. The specific impulse is based on a 42% by weight composition of N,N'-dimethyltriethylenediammonium dinitrate in anhydrous nitric acid. This is an outstandingly high specific impulse at this pressure since systems involving carbon, nitrogen, hydrogen and oxygen usually vary from a minimum of about 220 to a top or maximum of 240 pound seconds per pound. The specific impulse is defined as the pounds of thrust delivered by an ideal engine pumping a propellant into a combustion chamber to deliver one pound per second.

Another indication of the high utility of our new rocket fuels is evidenced by their low card gap reading. For example, N,N'-dimethyltriethylenediammonium dinitrate in mixture with white fuming nitric acid has a zero card gap reading. The card gap test measures the minimum hydrodynamic shock required to produce a stable propagation of a high order detonation. The lower the card gap reading, the more insensitive is the material to accidental detonation. Generally, materials which have a high energy content are usually more sensitive to hydrodynamic shock. Therefore it is necessary that materials useful for rocket fuels have a high energy but accompanied by a low hydrodynamic shock sensitivity in order that they may be handled, stored and otherwise used preparatory and during the rocket trip. The zero card gap reading of the N,N'-dimethyltriethylenediammonium dinitrate with 100% white fuming nitric acid is comparable with tetramethylammonium nitrate which had a two to four card gap while diisopropylammonium nitrate had a thirty-eight card gap. The card gap measurements were determined by the "Card Gap Test for Shock Sensitivity of Liquid Monopropellants," recommended test No. 1 of the American Rocket Society Committee on Monopropellant Testing Methods, published 1955.

Another important advantage of the new N,N'-dialkyltriethylenediammonium dinitrates is that they have a very high density as compared to other related propellants.

The new monopropellant components may be prepared by reacting triethylenediamine with the alkyl halide of the particular alkyl compound sought to be introduced into the molecule. This is accomplished in aqueous solution or other solvents and both of the alkyl substituents will add to the triethylenediamine at about the same time. The halide of the particular alkyl halide used will also enter into association with the molecule. The chloride or bromide is the most useful halogen for this reaction. The halide is then replaced by hydroxyl ion by the use of strongly basic anion exchange resin in hydroxyl form in aqueous solution. After formation of the N,N'-dialkyltriethylenediammonium dihydroxide, the hydroxyl ions are neutralized with nitric acid and the dinitrate compound is formed.

The reaction between the dialkyl halide and triethylenediamine can take place in aqueous solution or in any other suitable solvent, for example, methanol, ethanol, isopropanol, mixtures of alcohols and water, benzene, toluene, hexane, petroleum ether and dioxane. After mixing the reactants, the temperature is raised enough to induce the reaction, but high temperatures are generally unnecessary. A temperature of about 60 to 150° C. is generally all that is necessary for the reaction. In the case of the dialkyl halides which are gases at the reaction temperatures employed the reaction is best carried out in an autoclave.

The reaction of the N,N'-dialkyltriethylenediammonium dihalide with the strongly basic anion exchange resin in the hydroxyl form takes place in aqueous solution. Amberlite IRA-400 which is a chloromethylated styrene-divinylbenzene copolymer aminated with trimethylamine manufactured by the Rohm and Haas Company is a suitable resin for this reaction. This product may be made in accordance with the directions contained in U.S. Patent 2,591,573. Other suitable resins for this conversion are divinylbenzene-styrene copolymers with attached quaternary ammonium groups as exemplified by the commercial products of the Dow Chemical Company and sold under the names Dowex 1, Dowex 2 and Nalcite SAR, for example.

When the hydroxyl ion is depleted from the resin, it can be replaced by sodium hydroxide solutions by methods well known to those skilled in the art.

The conversion of the N,N'-dialkyltriethylenediammonium dihydroxide to the dinitrate compound is effected by nitric acid merely by contacting the two materials in aqueous solution. Generally the product in aqueous solution is then concentrated by evaporation after which the concentrate can be poured into alcohol whereupon the N,N'-dialkyltriethylenediammonium dinitrate will precipitate which is then filtered off and dried. Any residual amount of the product remaining in the filtrate can be recovered by further evaporation.

The best mode we contemplate for practicing our invention will be understood by a consideration of the following examples.

Example 1

Twenty-eight parts by weight of triethylenediamine, 59 parts by weight of n-propyl chloride and 200 parts of water are placed in a stainless steel autoclave, are heated at 100° for 4 hours. The resulting solution contains N,N'-di-n-propyltriethylenediammonium dichloride. This solution is then diluted with water, 1 part of solution to 2 parts of distilled water and is then run through an ion exchange column containing Amberlite IRA-400 in hydroxyl form. The effluent should be chloride free and contain N,N'-di-n-propyltriethylenediammonium dihydroxide. The solution is neutralized wtih 4 molar nitric acid and is then evaporated so that the volume of the solution is concentrated to about 1/20 of the original volume. After concentration by evaporation the N,N'-di-n-propyltriethylenediammonium dinitrate is poured into 95% ethyl alcohol, whereby the product is precipitated, filtered, washed and dried.

Example 2

Into a stainless steel autoclave 28 parts by weight of triethylene diamine, 32 parts by weight of methyl chloride and 100 parts by weight of water were charged and the autoclave closed. The mixture was agitated and heated at 80 to 100° C. for about 2½ hours. The resulting N,N'-dimethyltriethylenediammonium dichloride was diluted with about 5 volumes of distilled water and then run through an ion exchange column packed with Amberlite IRA-400 in hydroxyl form. The effluent was checked for chloride ion and found to be chloride free. The N,N'-dimethyltriethylenediammonium dihydroxide was neutralized with 6 molar nitric acid after which it was placed into an evaporatng pan. Here it was concentrated to about 1/10 of its original volume. After concentration, the concentrate was poured into 280 parts of 95% ethyl alcohol whereby the N,N'-dimethyltriethylenediammonium dinitrate precipitated. The product was filtered off and dried.

Eighteen parts by weight of product were obtained representing an 89% yield. The product had a melting point range of 282° C. to 285° C. with slight decomposition. The calculated analysis of the product is 36.09% carbon, 6.81% hydrogen, 21.4% nitrogen while the actual analysis was 36.09% carbon, 6.81% hydrogen and 20.82% nitrogen.

Example 3

Methyl chloride in the amount of 101 parts by weight was bubbled into 512 parts by weight of isopropyl alcohol solution containing 112 parts by weight of triethylenediamine. The introduction was carried out at atmospheric pressure and at a temperature of 60 to 80° C. The resulting slurry of N,N'-dimethyltriethylenediammonium dichloride was cooled to 25° C. and filtered. The chloride salt was analyzed, and the theoretical equivalent amount of potassium hydroxide, in this case about 130 parts by weight, was dissolved in 600 parts by weight of anhydrous methanol and held at 20 to 25° C. while the N,N'-methyltriethylenediammonium dichloride was added. The resulting slurry of N,N'-dimethyltriethylenediammonium dihydroxide was held at 25° C. with stirring for two hours and then the potassium chloride was filtered off in solution.

Water in the amount of 200 parts by weight was added to the alcohol solution of the quaternary dihydroxide after which the methanol was removed by distillation under reduced pressure at approximately 100 mm. The aqueous solution of the quaternary dihydroxide was then cooled to 20° C. after which nitric acid was added until the solution was neutral. Any chloride present was removed by adding silver nitrate and filtering out the silver chloride precipitate.

The aqueous solution of the N,N'-dimethyltriethylenediamine dinitrate was concentrated by evaporation under reduced pressure until crystals formed. Then the slurry was cooled to 0° C. and filtered. A further crop of the product was obtained by taking the filtrate and again heating under reduced pressure and further concentrating it. This was followed by cooling to 0° C. and filtering off a second crop of crystals which were dried at 50 to 60° C. in an oven.

The crystallization procedure was repeated until the mother liquor no longer yielded crystalline product. The N,N'-dimethyltriethylenediamine dinitrate was obtained in 75% yield based on triethylenediamine introduced.

In another form of our invention the mixed dialkyltriethylenediammonium dinitrates may be prepared. Thus, N - ethyl - N' - methyltriethylenediammonium dinitrate or N - methyl - N' - propyltriethylenediammonium dinitrate, N-ethyl-N'-neopentyltriethylenediammonium dinitrate and other mixed dialkyltriethylenediamonium dinitrates may be prepared so long as any one of the alkyl substituents does not exceed about 5 carbon atoms. These mixed dialkyltriethylenediammonium dinitrates may be incorporated in red fuming acid, white fuming nitric acid, 100% nitric acid, 100% nitrogen tetroxide in the same manner as the N,N'-dialkyltriethylenediammonium dinitrates wherein the alkyl substituents are identical.

The mixed dialkyltriethylenediammonium dinitrates are prepared by reacting triethylenediamine first with a deficiency of one of the desired alkyl halides followed by a second reaction with an excess of the other alkyl halide. Alternatively, the triethylenediamine may be reacted with a mixture of the alkyl halides desired, and they will substitute in the triethylenediamine depending on their concentration and on the order of the activity of the individual alkyl molecules.

These mixed N,N'-dialkyltriethylenediammonium dinitrates are combined with an oxidizer to form a monopropellant rocket fuel of high energy content in the same manner as the compositions in which the alkyl radicals are identical. Similarly, the fuel compositions may comprise mixtures of compounds having the triethylenediamine dinitrate nucleus but containing different dialkyl substituents together with the oxidizer and other necessary fuel components. An example of such a mixture would be a combination of N,N'-dimethyltriethylenediammonium dinitrate with N,N' - diethyltriethylenediammonium dinitrate or N,N'-dimethyltriethylenediammonium dinitrate with N-methyl-N'-ethyl-triethylenediammonium dinitrate. The N,N' - dialkyltriethylenediammonium dinitrate liquid oxidized compositions require help in the initial combustion in order to supply the activation energy after which sustained combustion can take place. This may be provided by a prior slug of hypergolic material which is fed into the combustion chamber along with the mixture of the dinitrate compound and nitric acid. Typical hypergolic materials are aniline, hydrazine and dimethylhydrazine. These react with nitric acid violently and produce sufficient heat to activate the N,N'-dialkyltriethylenediammonium dinitrates so that sustained combustion can then take place.

A second method of igniting the monopropellant material is by using a shotgun charge delivered directly into the combustion chamber in the presence of atomized monopropellant fuel. Similarly, a hot resistance wire or a spark-plug type of activator can also be used.

In general the amount of the dialkyltriethylenediammonium dinitrate added to the oxidizer will vary from a minimum of about 10% by weight of the oxidized to an optimum amount which will yield the highest specific impulse. Amounts exceeding that which will produce the highest specific impulse can be used but would not produce additional power. At present the fuel systems handling liquid fuels are not designed to handle slurrys so that an upper limit in the case of liquid oxidizers in the present state of the art would be the saturation amount in the liquid oxidizer. If the fuel system design is changed to handle slurries, then the amount in the liquid oxidizer could exceed the solubility limit. In applications of the N,N' - dialkyltriethylenediamines dinitrates to solid fuel systems there would not be any solubility questions to consider.

In a solid fuel system the N,N' - dialkyltriethylenediammonium dinitrates are mixed with solid oxidizers such as ammonium nitrates, ammonium perchlorate or potassium chlorate plus a solid organic binding agent. Conventional binding agents are nitrocellulose, polyethylene, polyacrylate, etc.

We claim:
1. An N,N' - dialkyltriethylenediammonium dinitrate in which the alkyl substituents range from $C_1$ through $C_5$ carbon atoms.
2. The compositions of claim 1 in which the alkyl substituents are identical.
3. N,N'-dimethyltriethylenediammonium dinitrate.
4. N,N'-diethyltriethylenediammonium dinitrate.
5. N-methyl-N'-ethyltriethylenediammonium dinitrate.
6. N - methyl - N' - isopropyltriethylenediammonium dinitrate.

References Cited by the Examiner

UNITED STATES PATENTS

| | | | |
|---|---|---|---|
| 2,832,784 | 4/1958 | Harfenist et al. | 260—268 |
| 2,964,526 | 12/1960 | Herrick | 260—268 |
| 2,973,361 | 2/1961 | Rudner | 260—268 |
| 3,010,963 | 11/1961 | Erner | 260—268 |
| 3,018,619 | 1/1962 | Doss et al. | 260—268 |
| 3,068,233 | 12/1962 | Moss | 260—268 |
| 3,073,827 | 1/1963 | Erner | 260—268 |
| 3,083,203 | 3/1963 | Milligan | 260—268 |
| 3,112,321 | 11/1963 | Levis et al. | 260—268 |

FOREIGN PATENTS

| | | |
|---|---|---|
| 159,562 | 11/1954 | Australia. |
| 735,631 | 8/1955 | Great Britain. |
| 798,488 | 7/1958 | Great Britain. |

OTHER REFERENCES

Mann et al.: Journal Chemical Society (London), No. 4, pp. 4476–4480 (1954).

Mann et al.: Journal Chemical Society (London), pp. 1881–1886 (1957).

Oae et al.: Journal Organic Chemistry, vol. 24, pp. 1348-1349 (1959).

NICHOLAS S. RIZZO, *Primary Examiner.*

WALTER A. MODANCE, *Examiner.*